US 8,237,612 B2

(12) United States Patent
Lin et al.

(10) Patent No.: US 8,237,612 B2
(45) Date of Patent: Aug. 7, 2012

(54) INFERRING BEACON POSITIONS BASED ON SPATIAL RELATIONSHIPS

(75) Inventors: Jyh-Han Lin, Mercer Island, WA (US); John Charles Krumm, Redmond, WA (US); Arjun Sundararajan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 228 days.

(21) Appl. No.: 12/711,889

(22) Filed: Feb. 24, 2010

(65) Prior Publication Data

US 2011/0205125 A1 Aug. 25, 2011

(51) Int. Cl.
*G01S 3/02* (2006.01)
(52) U.S. Cl. ...................................................... 342/451
(58) Field of Classification Search .................. 342/450, 342/451, 463, 465; 455/456.1, 456.6
See application file for complete search history.

(56) References Cited

U.S. PATENT DOCUMENTS

| 5,960,341 | A | 9/1999 | LeBlanc et al. |
| 6,473,038 | B2 | 10/2002 | Patwari et al. |
| 7,123,925 | B2 | 10/2006 | Robinson et al. |
| 7,319,877 | B2 | 1/2008 | Krumm et al. |
| 7,509,131 | B2 | 3/2009 | Krumm et al. |
| 7,548,517 | B2 | 6/2009 | Kyperountas et al. |
| 2007/0202887 | A1 | 8/2007 | Counts et al. |

FOREIGN PATENT DOCUMENTS

WO 2007001660 A3 1/2007

OTHER PUBLICATIONS

Sun, et al., "Signal Processing Techniques in Network-Aided Positioning: A Survey of State-of-the-Art Positioning Designs", Retrieved at <<http://ieeexplore.ieee.org/stamp/stamp.jsp?tp=&arnumber=1458273&isnumber=31384>>, IEEE Signal Processing Magazine, vol. 22, Issue. 4, Jul. 2005, pp. 12-23.
Letchner, et al., "Large-Scale Localization from Wireless Signal Strength", Retrieved at <<http://www.aaai.org/Papers/AAAI/2005/AAAI05-003.pdf>>, Proceedings of the 20th national conference on Artificial intelligence, vol. 1, Jul. 9-13, 2005, pp. 5-16.
Teller, et al., "Organic Indoor Location Discovery", Retrieved at <<http://dspace.mit.edu/bitstream/handle/1721.1/43951/MIT-CSAIL-TR-2008-075.pdf?sequence=1>>, Dec. 30, 2008, pp. 16.
Schreiner, et al., "A New Network-Based Positioning Method for Location Services in 2G and 3G Mobile Communications", Retrieved at <<http://ieeexplore.ieee.org/stamp/stamp.jsp?tp=&arnumber=1350177&isnumber=29685>>, 5th European Personal Mobile Communications Conference, 2003, pp. 162-168.
Bajada, Josef, "Mobile Positioning for Location Dependent Services in GSM Network", Retrieved at <<http://www.cs.um.edu.mt/~csaw/CSAW03/Proceedings/MobilePositioning.pdf>>, 2003, pp. 27-33.

(Continued)

*Primary Examiner* — Dao Phan (57) ABSTRACT

Estimating positions of beacons based on spatial relationships among neighboring beacons. Beacon reference data defining positions of beacons is stored from beacon fingerprints observed by devices (e.g., enabled with global positioning system receivers). For a received beacon fingerprint having at least one beacon for which the beacon reference data is missing (e.g., from a device without a GPS receiver), beacons in the received beacon fingerprint for which beacon reference data is available are identified. Based on these identified beacons, the missing beacon reference data is calculated. In some embodiments, a set of spatially diverse beacons is selected from the identified beacons prior to calculating the beacon reference data.

20 Claims, 5 Drawing Sheets

OTHER PUBLICATIONS

Biuk-Aghai, Robert P., "GSM-Based Provider-Independent Positioning Method", Retrieved at <<http://www.location.net.in/proceeding/Emergingtechnology/Emerging%20Technologies_1.htm>>, Oct. 5, 2009, pp. 3.

Chen, et al., "Practical Metropolitan-Scale Positioning for GSM Phones", Retrieved at <<http://www.seattle.intel-research.net/pubs/100920061625_366.pdf>>, Ubicomp, 2006, pp. 225-242.

Otsason, et al., "Accurate GSM Indoor Localization", Retrieved at <<http://www.placelab.org/publications/pubs/ubicomp2005-indoorGSM.pdf>>, 2005, pp. 141-158.

Cheng, et al., "Accuracy Characterization for Metropolitan-Scale Wi-Fi Localization", Retrieved at <<http://www.seattle.intel-research.net/pubs/100220060939_332.pdf>>, Jan. 2005, pp. 13.

Subramanian, et al., "Drive-by Localization of Roadside WiFi Networks", Retrieved at <<http://www.cse.psu.edu/~gcao/teach/598/das-localization.pdf>>, 2008, pp. 1-9.

Fox, et al., "Bayesian Filtering for Location Estimation", Retrieved at <<http://seattleweb.intel-research.net/pubs/fox2003bayesian.pdf>>, IEEE Pervasive Computing, vol. 2, No. 3., Sep. 2003, pp. 11.

Hightower, et al., "Particle Filters for Location Estimation in Ubiquitous Computing: A Case Study", Retrieved at <<http://seattleweb.intel-research.net/pubs/100220060958_333.pdf>>Sixth International Conference on Ubiquitous Computing, Sep. 7, 2004, pp. 18.

Eagle, et al., "Methodologies for Continuous Cellular Tower Data Analysis", Retrieved at <<http://reality.media.mit.edu/pdfs/pervasive09.pdf>>, Proceedings of the 7th International Conference on Pervasive Computing, May 11-14, 2009, pp. 1-13.

Minka, et al., "Infer.NET", Retrieved at <<http://research.microsoft.com/infernet>>, Infer.NET 2.2, Microsoft Research, Cambridge, 2009, pp. 1.

Minkyong, et al., "Risk of Using AP Locations Discovered Through War Driving," Abstract, Pervasive, Springer-Verlag, 2006, pp. 1-2.

Khalaf-Allah, "Nonparametric Bayesian Filtering for Location Estimation, Position Tracking, and Global Localization of Mobile Terminals in Outdoor Wireless Environments," Abstract, EURASIP Journal on Advances in Signal Processing, vol. 2008, Jan. 2008, pp. 1.

INFERRING BEACON POSITIONS BASED ON SPATIAL RELATIONSHIPS

BACKGROUND

Some existing positioning systems such as global positioning systems (GPS) determine the location of devices using satellites. Other systems such as collaborative positioning systems determine the location of the devices based on crowd-sourced data. The crowd-sourced data typically includes a list of beacons observed at a particular location along with identification of the particular location as obtained by mobile devices such as laptops, netbooks, and cellular telephones. Existing systems calculate the position of each beacon in the list based on the crowd-sourced data. The beacon positions are then used to estimate the location of devices (e.g., those lacking GPS capability or coverage) that request position information based on an observed list of beacons. The accuracy of these estimated device locations depends in part on the quantity of beacons in the observed list of beacons for which positional information has been previously determined.

To increase the quantity of beacons of known position based on received crowd-sourced data that lacks GPS information, existing systems have attempted to calculate the position of beacons based on signal strength, ambient commercial radio signals, and other broadcast characteristics.

SUMMARY

Embodiments of the disclosure enable estimation of the location of beacons lacking beacon reference data based on beacon reference data and spatial relationships of other beacons. A first plurality of beacon identifiers and a second plurality of beacon identifiers are received. Beacon reference data associated with one or more of the first plurality of beacon identifiers is accessed. One or more beacon identifiers common to the first plurality of beacon identifiers and to the second plurality of beacon identifiers are identified. From the determined beacon identifiers, beacon identifiers having the accessed beacon reference data associated therewith are selected. Beacon reference data for the second plurality of beacon identifiers is calculated based at least on the selected beacon identifiers and the accessed beacon reference data associated therewith.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure include a collaborative positioning system for estimating positions of beacons based on positions of neighboring beacons selected due to spatial relationships among the beacons. Some embodiments model the beacons and spatial relationships as graphs and perform set operations on a continuous basis. For example, the beacons, spatial relationships, and set operations may be implemented in a database programming language such as Structure Query Language (SQL).

Referring again to FIG. 1, an exemplary block diagram illustrates the positioning system 106 inferring a location of a mobile device 102 based on a beacon fingerprint provided by the mobile device 102. The mobile device 102 (e.g., a mobile telephone) detects or observes one or more beacons including cellular towers (or sectors if directional antennas are employed) and wireless fidelity (Wi-Fi) access points or other wireless access points (WAPs).

Figure 1:
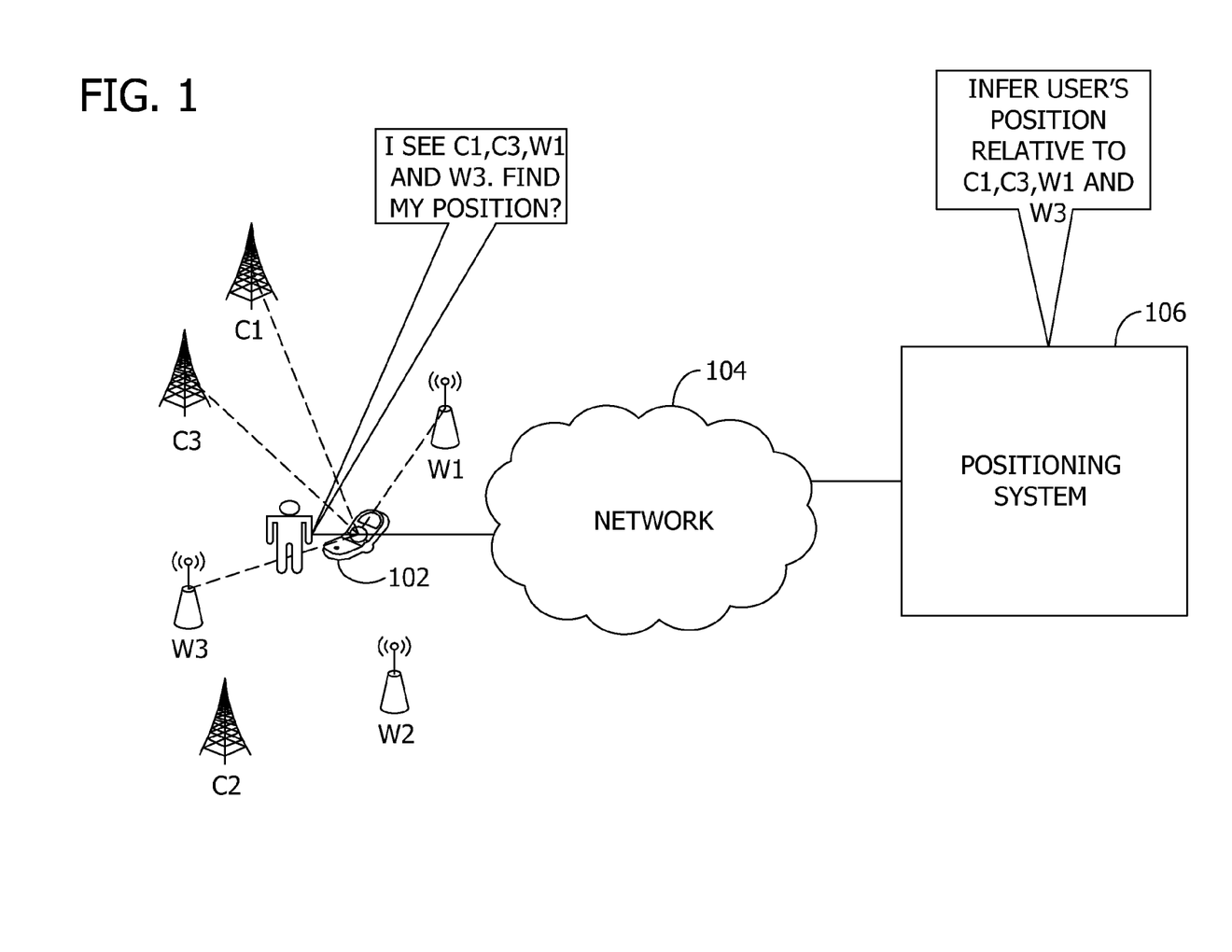
FIG. 1 is an exemplary block diagram illustrating a positioning system inferring a location of a mobile device based on a beacon fingerprint provided by the mobile device.

The beacons detected by the mobile device 102 at a given point in time represent the beacon fingerprint. The beacon fingerprint may also include other attributes of the detection such as signal strength. While aspects of the disclosure may be described with reference to beacons implementing protocols such as the 802.11 family of protocols, embodiments of the disclosure are operable with any beacon for wireless communication. In the example of FIG. 1, the mobile device 102 detects the presence of beacons C1, C3, W1, and W3.

The mobile device 102 provides the detected beacon fingerprint to the positioning system 106 via a network 104. The network 104 includes a wireless cellular network in some embodiments, but other types of networks such as Wi-Fi and those providing Internet access are contemplated in other embodiments.

Figure 2:
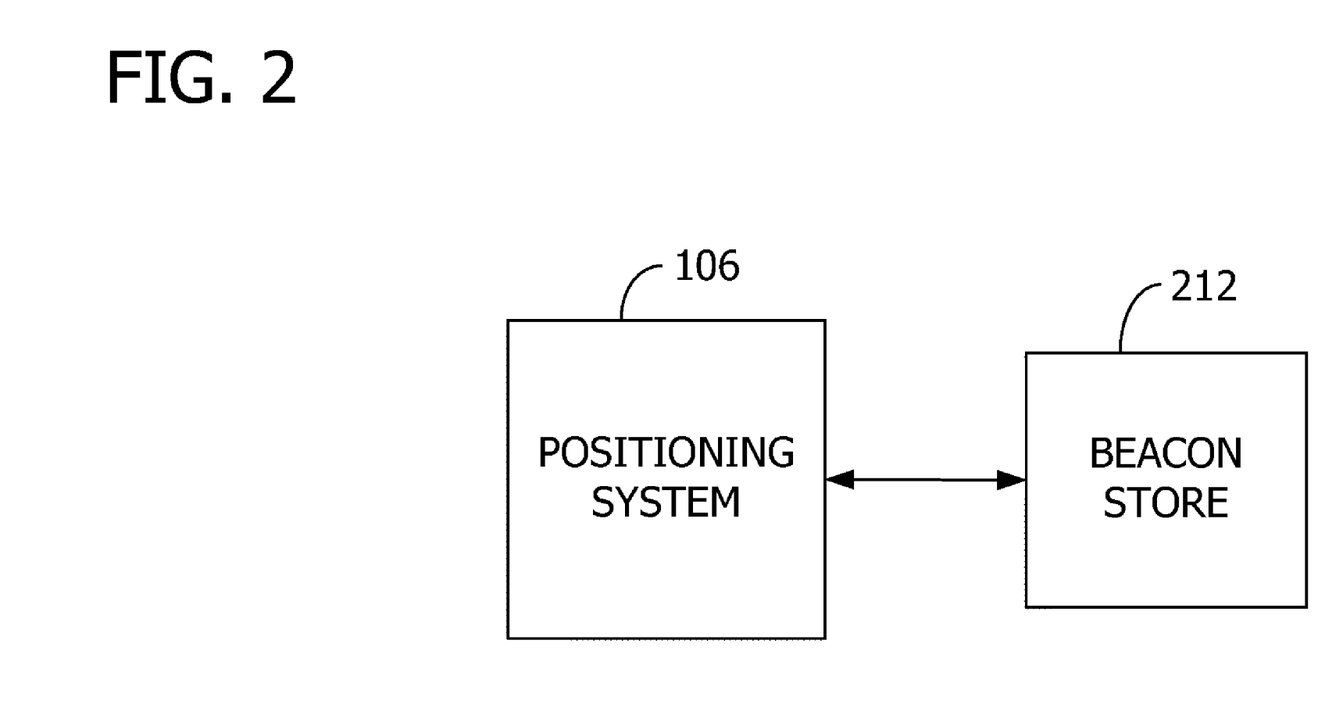
FIG. 2 is an exemplary block diagram illustrating collection of beacon fingerprints from which to infer beacon reference data.

Referring next to FIG. 2, an exemplary block diagram illustrates the positioning system 106 having access to a beacon store 212. The positioning system 106 stores, or has access to, data describing the approximate location of one or more of the beacons. The data is referred to as beacon reference data 314 and may be stored in the beacon store 212 such as shown in FIG. 2. Alternatively or in addition, the beacon reference data 314 may be stored internal to the positioning system 106. In some embodiments, the beacon reference data 314 includes a longitude value, latitude value, and altitude value for the beacons. Using the approximate location of at least one of the beacons in the detected beacon fingerprint, the positioning system 106 operates to infer the position of devices such as the mobile device 102.

Figure 3:
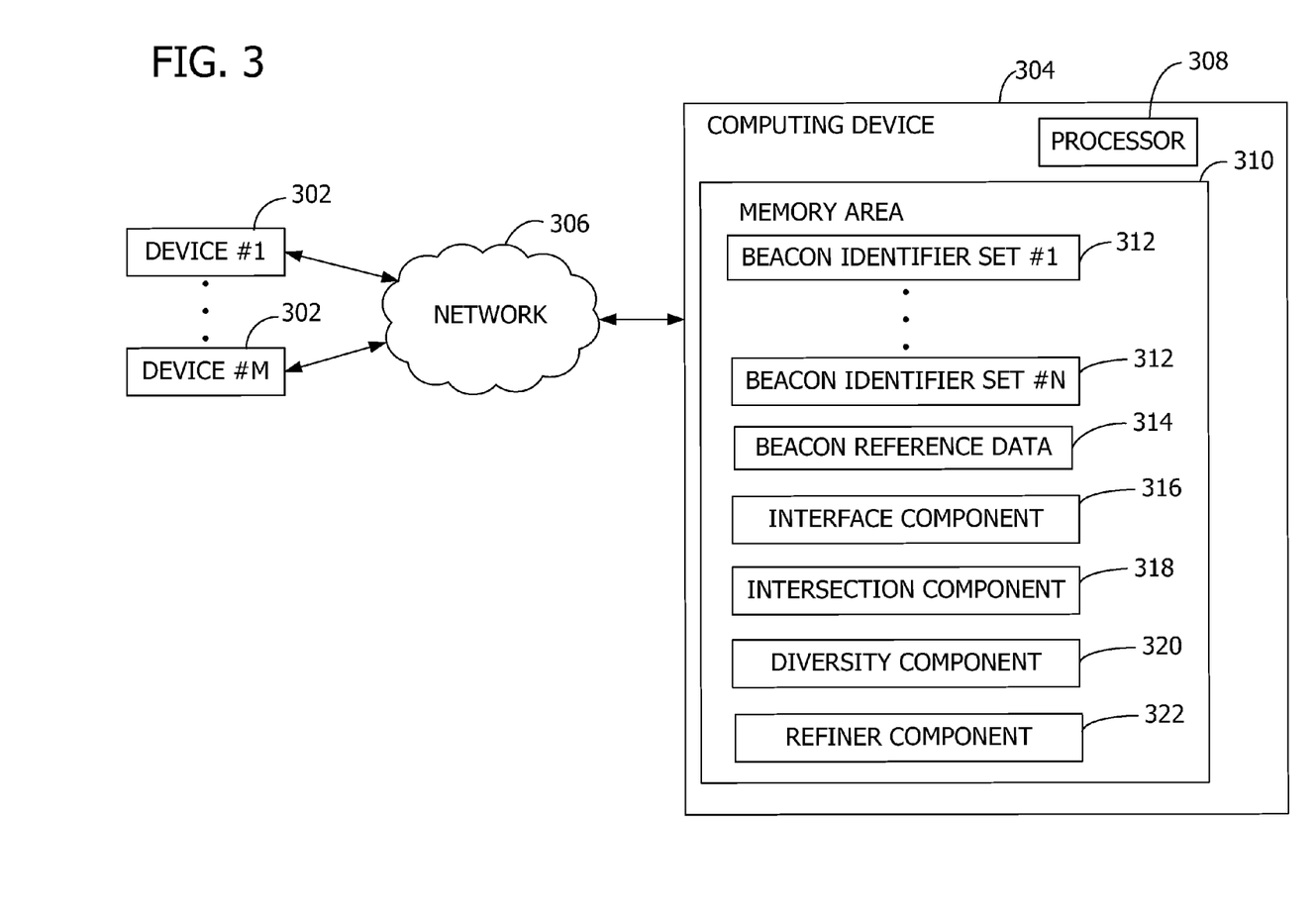
FIG. 3 is an exemplary block diagram illustrating a computing device collecting crowd-sourced data for use in calculating beacon reference data.

Referring next to FIG. 3, exemplary block diagram illustrates a computing device 304 collecting crowd-sourced data for use in calculating the location of beacons. The computing device 304 includes exemplary elements for estimating the location of beacons lacking beacon reference data 314 based on spatial relationships among the beacons and based on the beacon reference data 314 associated with other beacons. In some embodiments, the computing device 304 is associated with the positioning system 106.

The computing device 304 collects data from one or more of the devices 302, such as device #1 through device #M via a network 306. The devices 302 include, for example, mobile computing devices such as mobile device 102 enable with global positioning system (GPS) receivers. However, the devices 302 may include any device executing instructions (e.g., application programs) to provide data. The data includes beacon fingerprints. The devices 302 may provide the data for collection at regular intervals (e.g., with heartbeat messages), upon request, piggybacked on other messages from the devices 302 (e.g., with search queries), upon geography changes, or otherwise in accordance with a condition, event, or defined interval.

In some embodiments, the devices 302 include portable computing devices such as laptops, netbooks, gaming devices, and/or portable media players. Further, each of the devices 302 may represent a group of processing units or other computing devices.

Exemplary networks 306 include wired and/or wireless networks, and may represent local area networks or global networks such as the Internet. In embodiments in which the network 306 includes wireless networks, the computing device 304 and the devices 302 may be enabled with technology such as BLUETOOTH brand wireless communication services (secured or unsecured), radio frequency identification (RFID), Wi-Fi such as peer-to-peer Wi-Fi, ZIGBEE brand wireless communication services, near field communication (NFC), and other technologies that enable short-range or long-range wireless communication.

The computing device 304 has at least one processor 308 and one or more computer-readable media such as a memory area 310. The processor 308 includes any quantity of processing units, and is programmed to execute computer-executable instructions for implementing aspects of the disclosure. The instructions may be performed by the processor 308 or by multiple processors executing within the computing device 304, or performed by a processor external to the computing device 304 (e.g., by a cloud service). In some embodiments, the processor 308 is programmed to execute instructions such as those illustrated in the figures (e.g., FIG. 4).

The memory area 310 includes any quantity of media associated with or accessible to the computing device 304. The memory area 310 may be internal to the computing device 304 (as shown in FIG. 3), external to the computing device 304 (not shown), or both (not shown).

The memory area 310 stores beacon identifier sets 312, such as beacon identifier set #1 through beacon identifier set #N. Each set 312 of beacon identifiers corresponds to, in some embodiments, a beacon fingerprint. Each of the beacon identifiers corresponds to one of the beacons. For example, each Wi-Fi beacon has a Basic Service Set Identifier (BSSID). In another example, each Global Service for Mobile communications (GSM) cellular tower includes a mobile country code (MCC), mobile network code (MNC), location area code (LAC), and a cell identifier. Universal Mobile Telecommunication System (UMTS) towers have beacon identifiers composed of MCC, MNC, and a cell identifier. Carrier Division Multiple Access (CDMA) towers have beacon identifiers composed of a system identifier, network identifier, and a base-station identifier.

The memory area 310 further stores the beacon reference data 314 corresponding to one or more beacons. For example, the memory area 310 may store beacon reference data 314 for some of the beacons, but lack beacon reference data 314 for other beacons. In some embodiments, the same beacon identifier may be associated with more than one position because the beacon identifier appears in more than one set 312 of beacon identifiers, and each set 312 may have a different position associated with the beacon identifier.

The memory area 310 further stores one or more computer-executable components for implementing aspects of the disclosure. Exemplary components include an interface component 316, intersection component 318, diversity component 320, and refiner component 322. Operation of the components is discussed below with reference to FIG. 4.

At least a portion of the functionality of the various elements in FIG. 3 may be performed by other elements in FIG. 3, or an entity (e.g., processor, web service, server, application program, computing device, etc.) not shown in FIG. 3.

Figure 4:
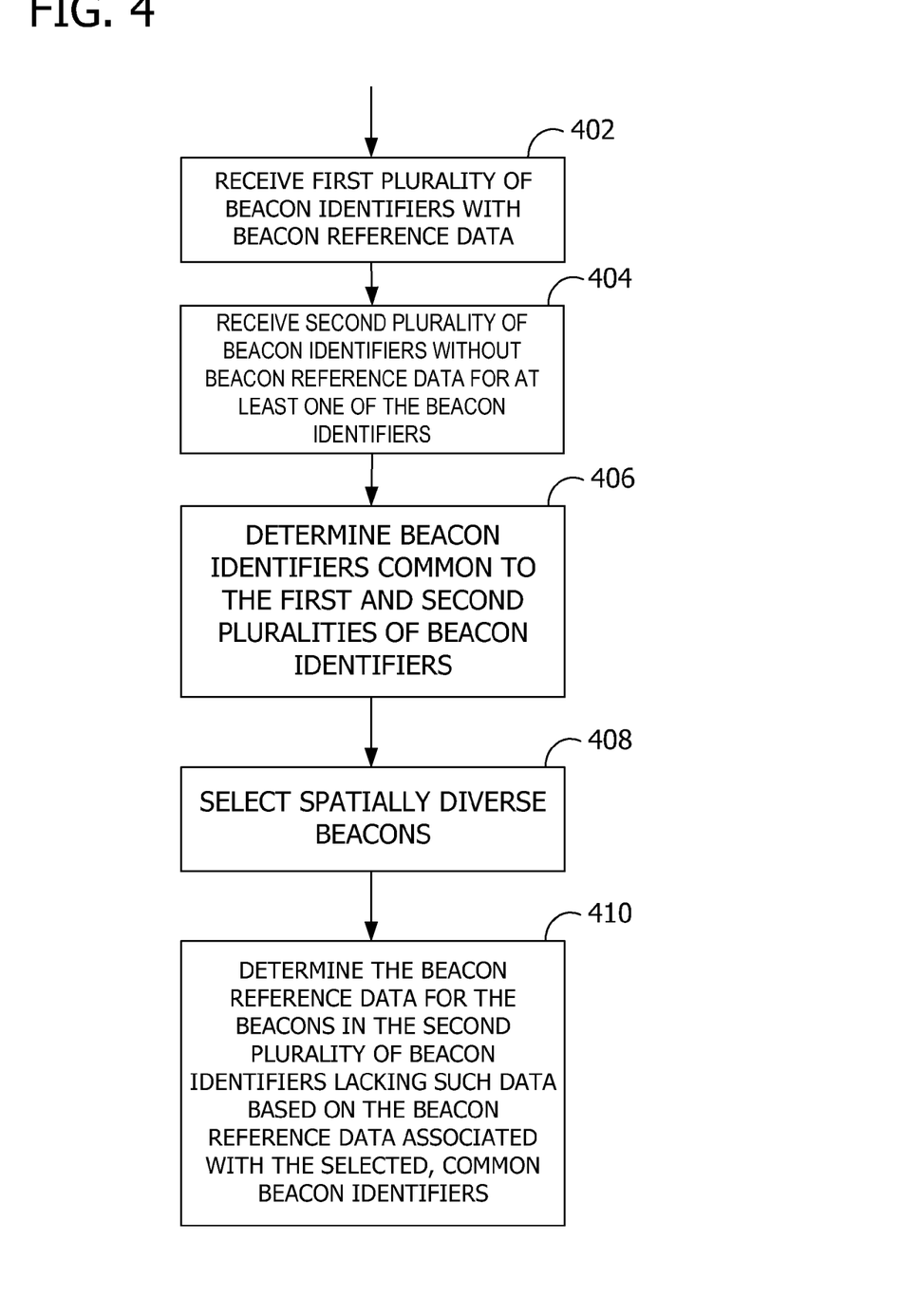
FIG. 4 is an exemplary flow chart illustrating beacon position estimation based on spatial relationships among the beacons.

Referring next to FIG. 4, an exemplary flow chart illustrates beacon position estimation based on spatial relationships among the beacons. At 402, a first plurality or set of beacon identifiers with beacon reference data 314 associated therewith is received. At 404, a second plurality or set of beacon identifiers without beacon reference data 314 for at least one of the beacon identifiers in the second plurality is received. In some embodiments, the received first and second pluralities of beacon identifiers are represented as an undirected graph. The undirected graph corresponds to, for example, beacons and edges connecting the beacons.

At 406, one or more beacon identifiers common to the first plurality of beacon identifiers and to the second plurality of beacon identifiers are determined. The identified, common beacon identifiers correspond to beacons that were detected in both of the sets received at 402 and 404. At 408, beacon identifiers corresponding to spatially diverse beacons are selected from among the beacon identifiers determined at 406. The spatially diverse beacons represent the beacons that are spread out over an area defined or covered by the beacon identifiers determined at 406. In some embodiments, selecting the spatially diverse beacons includes finding the maximum independent subset of the determined beacon identifiers.

At 410, based at least on the selected, spatially diverse beacon identifiers and associated beacon reference data 314, beacon reference data 314 is calculated for the beacon identifiers in the second plurality of beacon identifiers for which beacon reference data 314 is not available. For example, the calculation may include a weighted average, mean, or other combination of the beacon reference data 314 associated with the selected beacon identifiers. Each of the weights may depend on the number of times that the beacons corresponding to the beacon identifiers being considered have been observed together. In this manner, the positions of the beacons without beacon reference data 314 are calculated based on the positions of the selected neighboring beacons (e.g., the spatially diverse beacons). However, other calculations to estimate the positions are contemplated. Further, additional calculations may be performed.

In some embodiments, the operations illustrated in FIG. 4 are performed by the computing device 304. In other embodiments, one or more of the operations illustrated in FIG. 4 are performed by another computing device (e.g., as a web service). In still other embodiments such as peer-to-peer embodiments, one or more of the operations illustrated in FIG. 4 are performed by the devices 302.

Further, the operations illustrated in FIG. 4 may be implemented as software instructions encoded on a computer-readable medium, in hardware programmed or designed to perform the operations, or both. As an example, the operations in FIG. 4 may be implemented as computer-executable components or other software such as in the components illustrated in FIG. 3. In such an example, the interface component 316, when executed by the processor 308, causes the processor 308 to receive at least one beacon fingerprint defining a first plurality of beacons and including beacon reference data 314 associated therewith. The interface component 316 further receives at least one beacon fingerprint defining a second plurality of beacons. At least one of the second plurality of beacons lacks beacon reference data 314.

The intersection component 318, when executed by the processor 308, causes the processor 308 to identify one or more beacons common to the first plurality of beacons and to the second plurality of beacons. The diversity component 320, when executed by the processor 308, causes the processor 308 to select, from the beacons identified by the intersection component 318, beacons that are spatially diverse. For example, the diversity component 320 selects beacons that are spatially diverse by finding the maximum independent subset of the beacons identified by the intersection component 318.

The refiner component 322, when executed by the processor 308, causes the processor 308 to determine the beacon reference data 314 for the beacons lacking such data in the second plurality of beacons based at least on the beacons selected by the diversity component 320 and the beacon reference data 314 associated with the selected beacons.

In some embodiments, the intersection component 318, diversity component 320, and refiner component 322 model the first plurality of beacons and the second plurality of beacons as graph-theoretic data structures as described below. Further, the intersection component 318, diversity component 320, and refiner component 322 are implemented with a database programming language, also as described below.

Figure 5:
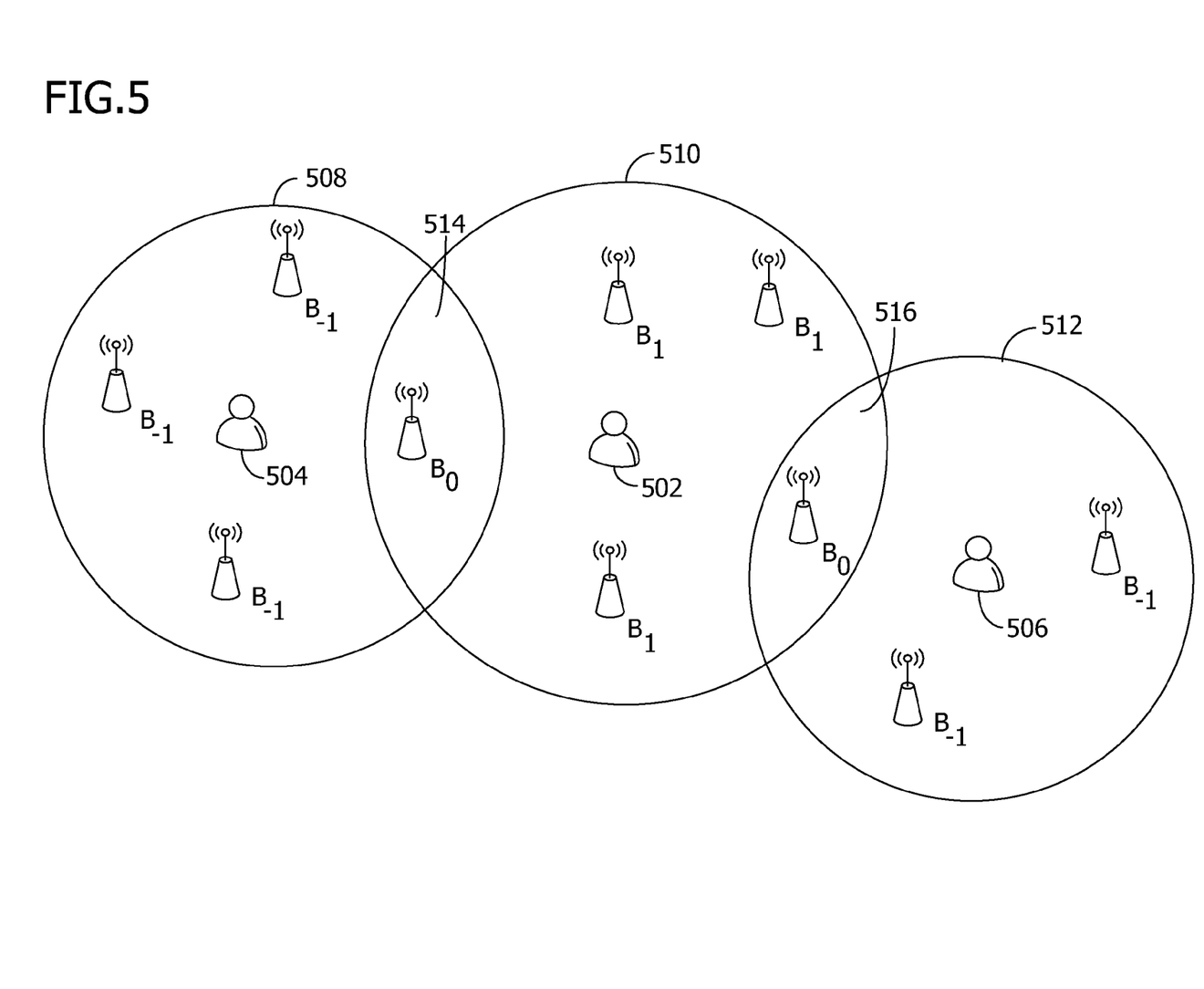
FIG. 5 is an exemplary block diagram illustrating three beacon fingerprints and beacon overlap.

Referring next to FIG. 5, an exemplary block diagram illustrates three beacon fingerprints with overlap to enable determination of the location of beacons that lack beacon reference data 314. Beacon fingerprint 508 was observed by device 504 and beacon fingerprint 512 was observed by device 506. In this example, the beacon fingerprints 508, 512 were provided to the positioning system 106 with beacon reference data 314 for the beacons observed within the fingerprints 508, 512. The beacon reference data 314 was stored in the beacon store 212.

The positioning system 106 receives beacon fingerprint 510 as observed by device 502 without beacon reference data 314 for the beacons within the beacon fingerprint 510. The positioning system 106 then identifies the beacons within the beacon fingerprint 510 for which beacon reference data 314 is available within the beacon store 212. In this example, beacon fingerprint 510 shares an overlap area 514 with beacon fingerprint 508 and beacon fingerprint 510 shares an overlap area 516 with beacon fingerprint 512. Beacon reference data 314 for the beacons within the overlap areas 514, 516 is available within the beacon store 212. The positioning system uses this beacon reference data 314 to calculate beacon reference data 314 for the remaining beacons in beacon fingerprint 510. The calculated positions for the remaining beacons in beacon fingerprint 510 are stored in the beacon store 212.

In the example of FIG. 5, the beacons are sorted, categorized, or otherwise organized based on their spatial relationships. For example, beacons may be sorted into the following categories: non-border beacons ($B_{-1}$ beacons), border beacons ($B_0$ beacons), frontier beacons ($B_1$ beacons), and floater beacons (beacons outside the beacon fingerprints 508, 510, 512, not shown). According to aspects of the disclosure, beacon reference data 314 for the $B_1$ beacons in beacon fingerprint 510 is determined based on the beacon reference data 314 associated with the $B_0$ beacons in overlap areas 514 and 516.

To estimate the positions of the $B_1$ beacons, aspects of the disclosure model the beacons and spatial relationships with graph theory. In such embodiments, F is a set of beacon fingerprints. An undirected graph G={B, E} has B as a set of nodes where each node represents a beacon and E is a set of edges connecting the beacon nodes. Two beacons $b_i$, $b_j$ are connected by the edge $e_{ij}$ if $b_i$ and $b_j$ have been co-observed (or co-detected) in at least one of the fingerprint in F. Each edge $e_{ij}$ is weighted by the frequency of co-detection. There are two types of beacons in B: beacons with estimated positions and radius of uncertainty and beacons without estimated positions. For beacons with estimated positions, $b_i$ denotes the estimated beacon position, $r_i$ is the 95% radius of beacon $b_i$ per output from the refiner, and $C_i$ is the circle centered at $b_i$ with radius $r_i$. The 95% radius means that for each $b_i$, if the client device detects beacon $b_i$ at position y, then y is within $C_i$ with 95% probability. Given a maximum radius $R_{max}$, aspects of the disclosure find as many beacons $b_j$ as possible from the set of unknown beacons and estimate their position and radius such that the circle $C_j$ for beacon $b_j$ satisfies a 95% "radius of uncertainty" probability and Radius $r_j \leq R_{max}$. These beacons are placed in set $B_r$.

With a diversity constant $n_{min}$ as a fixed positive constant greater than 1, the beacon set B is partitioned using exemplary co-detection relations as in the following Table 1. When $n_{min}=2$, for example, any beacon in $B_1$ is neighboring at least two known beacons in $B_0$.

TABLE 1

Exemplary Spatial Relationships Among Beacons.

| | |
|---|---|
| $B_{-1}$ (the non-border set) | The set of beacons with known, estimated positions and are not directly connected to any unknown beacons |
| $B_0$ (the border set) | The set of beacons with known, estimated positions but are connected directly with at least one unknown beacon |
| $B_1$ (the frontier set) | The set of beacons in B − ($B_{-1} + B_0$) with a non-zero-weight edge to at least $n_{min}$ beacons in $B_0$. Beacons in $B_1$ may be connected but are excluded in the counting. |
| $B_2$ (the floater set) | The set of beacons in B − ($B_{-1} + B_0 + B_1$) with a non-zero-weight edge to less than $n_{min}$ beacons in ($B_{-1} + B_0 + B_1$). |

Continuing the graph theory example, G'={$B_0+B_1$, E'} is a sub-graph of G where the edge set E' is restricted to edges connecting nodes in the beacon set $B_0+B_1$. For each beacon $b_j$ in $B_1$, there are at least $n_{min}$ beacons in $B_0$ that are connected to $b_j$. This set of beacons may be denoted as $B(b_j)=\{b_{j1}, b_{j2}, \ldots, b_{jk}\} \subset B_0$, where $k \geq n_{min} \geq 2$. The position and error radius for each $b_j$ in $B_1$ may be determined from $B(b_j)$. To maximize the spatial diversity in this example, the maximum independent subset of $B(b_j)$ is found and represented by $A(b_j)$. For example, a pair of beacons $b_x$, $b_y$ in $B(b_j)$ are independent if their corresponding circles $C_x$, $C_y$ do not intersect in a substantial or significant way. Mathematically, for a fixed constant $0 < a \leq 1$, Equation (1) below represents the spatial diversity.

$$Dist(b_x, b_y) \geq a(r_x + r_y) \qquad (1)$$

Setting a to ⅔, for example, allows moderate intersection while setting a is set to 1 is for no intersection. If $A(b_j)=\{b_{j1}, b_{j2}, \ldots, b_{jt}\} \subset B_0$, where $2 \leq t \leq k$, $e_{j,js}$ is the edge weight between $b_j$ and $b_{js}$ where $2 \leq s \leq t$, the estimated position for $b_j$ is a weighted average of neighboring beacon positions such as shown in Equation (2) below.

$$b_j = \frac{\sum_{s=1}^{t} e_{j,js} \times b_{js}}{\sum_{s=1}^{t} e_{j,js}} \quad (2)$$

In this example, when all weights are equal or the edges are not weighted, the weighted average is the simple mean.

The error radius $r_j$ is estimated in some embodiments as follows in Equation (3).

$$r_j = \mathrm{Max}_{1 \leq s \leq t}\{Dist(b_j, b_{js})\} \quad (3)$$

An exemplary flow or pseudo code for implementing aspects of the graph theory operations described above as computer-executable instructions is listed below.
1. Initialize
   1.1. Partition G such that $G=\{B_{-1}+B_0+B_1+B_2, E\}$
   1.2. Set $B_t=\emptyset$
2. Neighbor Refine and Re-Partition
   2.1. Set $G'=\{B_0+B_1, E'\}$
   2.2. If $B_1$ is empty (e.g., no more refining possible), then go to Operation 3.
   2.3. Else refine $B_1$ from $B_0$ by NeighborRefine(G') (e.g., estimate position and radius for $B_1$)
   2.4. Set $B_t=B_t \cup B_1$
   2.5. Re-partition G with the beacons in $B_1$ now marked as known beacons; go to Operation 2.1
3. Remove from $B_t$ all $b_j$ such that $r_j > R_{max}$ Additional Examples The operations illustrated and described herein may be implemented in a plurality of ways. The following example is a SQL implementation. Table 2 below shows an exemplary beacon detection log.

TABLE 2

Beacon Detection Log (e.g., Neighbor Data From Cross Post).

| BeaconID | TransactionID |
|---|---|
| $b_1$ | $T_1$ |
| $b_2$ | $T_1$ |
| $b_3$ | $T_1$ |
| $b_1$ | $T_2$ |
| $b_2$ | $T_2$ |
| $b_4$ | $T_2$ |
| $b_5$ | $T_2$ |
| $b_{11}$ | $T_3$ |
| $b_{12}$ | $T_3$ |
| $b_{13}$ | $T_3$ |

Table 3 below shows beacon reference data for selected beacon identifiers.

TABLE 3

Exemplary Beacon Reference Data.

| BeaconID | Position | Radius |
|---|---|---|
| $B_1$ | 3, 5 | 500 |
| $B_3$ | 2, 5 | 200 |
| $B_4$ | 3, 2 | 300 |

Given Table 2 and Table 3, a SQL operation to JOIN the two tables (partitioned by transaction identifier) produces the Table 4 below.

TABLE 4

Results of JOIN operation.

| BeaconId | TransactionId | Position | Radius |
|---|---|---|---|
| $B_1$ | $T_1$ | 3, 5 | 500 |
| $B_2$ | $T_1$ | NULL | NULL |
| $B_3$ | $T_1$ | 2, 5 | 200 |
| $B_1$ | $T_2$ | 3, 5 | 500 |
| $B_2$ | $T_2$ | NULL | NULL |
| $B_4$ | $T_2$ | 3, 2 | 300 |
| $B_5$ | $T_2$ | NULL | NULL |
| $b_{11}$ | $T_3$ | NULL | NULL |
| $b_{12}$ | $T_3$ | NULL | NULL |
| $b_{13}$ | $T_3$ | NULL | NULL |

Additional SQL operations group the entries by TransactionID and generate an adjacency list with $n_{min}=2$: $B_{-1}=\emptyset$, $B_0=\{b_1, b_3, b_4\}$, $B_1=\{b_2, b_5\}$, $B_2=\{b_{11}, b_{12}, b_{13}\}$) as shown in Table 5 below.

TABLE 5

Exemplary Adjacency List.

| BeaconUnknown | BeaconKnown | Position | Radius | Count |
|---|---|---|---|---|
| $B_2$ | $B_1$ | 3, 5 | 500 | 2 |
| $B_2$ | $B_3$ | 2, 5 | 200 | 1 |
| $B_5$ | $B_1$ | 3, 5 | 500 | 1 |
| $B_5$ | $B_4$ | 3, 2 | 300 | 1 |
| $B_2$ | $B_4$ | 3, 2 | 300 | 1 |

Positional data 314 such as the position and error radius is calculated and inserted into a table such as Table 6 below.

TABLE 6

Exemplary Table to Store Estimated Position and Radius Values.

| BeaconUnknown | Position | Radius |
|---|---|---|
| $B_2$ | (Estimate) | (Estimate) |
| $B_5$ | (Estimate) | (Estimate) |

In some examples, aspects of the disclosure operate to improve a location query success rate from 84.07% to 90.86% and from 82.68% to 88.45%.

While embodiments have been described with reference to data collected from users, aspects of the disclosure provide notice to the users of the collection of data (e.g., via a dialog box or preference setting) and the opportunity to give or deny consent. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for selecting beacons based on spatial relationships and calculating the beacon reference data, and exemplary means for spatially modeling the sets of beacon identifiers to select beacons from which to calculate the beacon reference data.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for estimating the location of beacons based on spatial relationships and beacon reference data associated with other beacons, said system comprising:
    a memory area storing sets of beacon identifiers, said memory area further storing beacon reference data for the beacon identifiers in at least a first one of the sets; and
    a processor programmed to:
        identify a second one of the sets lacking beacon reference data for at least one of the beacon identifiers in said second one of the sets;
        determine one or more beacon identifiers common to the first one of the sets and to the second one of the sets;
        select, from the determined beacon identifiers, beacon identifiers corresponding to beacons that are spatially diverse; and
        calculate the beacon reference data for said at least one of the beacon identifiers based on the beacon reference data associated with the selected beacon identifiers and stored in the memory area.

2. The system of claim 1, wherein the processor is further programmed to represent the sets of beacon identifiers as an undirected graph including a set of beacons and a set of edges connecting the beacons.

3. The system of claim 1, wherein the processor is further programmed to calculate an error radius for the calculated beacon reference data.

4. The system of claim 1, wherein the first one of the sets corresponds to beacons located in a first geographic area and the second one of the sets corresponds to beacons locations in a second geographic area, and wherein the processor is programmed to determine the one or more beacon identifiers common to the first one of the sets and to the second one of the sets by determining the beacons located in both the first geographic area and the second geographic area.

5. The system of claim 1, wherein the processor is programmed to select beacon identifiers corresponding to beacons that are spatially diverse by finding the maximum independent subset of the determined beacon identifiers.

6. The system of claim 1, further comprising means for selecting beacons based on spatial relationships and calculating the beacon reference data.

7. The system of claim 1, further comprising means for spatially modeling the sets of beacon identifiers to select beacons from which to calculate the beacon reference data.

8. A method comprising:
    receiving, by at least one processor, a first plurality of beacon identifiers and a second plurality of beacon identifiers;
    accessing beacon reference data associated with one or more of the first plurality of beacon identifiers;
    determining one or more beacon identifiers common to the first plurality of beacon identifiers and to the second plurality of beacon identifiers;
    selecting, by at least one processor from the determined beacon identifiers, beacon identifiers having the accessed beacon reference data associated therewith; and
    calculating, by at least one processor, beacon reference data for the second plurality of beacon identifiers based at least on said selected beacon identifiers and the accessed beacon reference data associated therewith.

9. The method of claim 8, further comprising representing the first plurality of beacon identifiers and the second plurality of beacon identifiers as an undirected graph including a set of beacons and a set of edges connecting the beacons.

10. The method of claim 8, further comprising calculating an error radius for the calculated beacon reference data.

11. The method of claim 8, further comprising selecting the beacon identifiers corresponding to beacons that are spatially diverse by finding the maximum independent subset of the determined beacon identifiers.

12. The method of claim 8, wherein calculating the beacon reference data comprises calculating a weighted average of the beacon reference data associated with the selected beacon identifiers.

13. The method of claim 8, further comprising sorting each of the first plurality of beacon identifiers and the second plurality of beacon identifiers into one of the following categories: non-border beacons, border beacons, frontier beacons, and floater beacons.

14. The method of claim 8, wherein receiving the first plurality of beacon identifiers comprises receiving a plurality of beacon fingerprints from a plurality of mobile computing devices.

15. One or more computer storage media having computer-executable components, said components comprising:
- an interface component that when executed causes at least one processor to receive a first beacon fingerprint, said first beacon fingerprint defining a first plurality of beacons and including beacon reference data associated therewith, wherein the interface component further receives a second beacon fingerprint, said second beacon fingerprint defining a second plurality of beacons and lacking beacon reference data for at least one of the second plurality of beacons;
- an intersection component that when executed causes at least one processor to identify one or more beacons common to the first plurality of beacons and to the second plurality of beacons;
- a diversity component that when executed causes at least one processor to select, from the beacons identified by the intersection component, beacons that are spatially diverse; and
- a refiner component that when executed causes at least one processor to determine the beacon reference data for said at least one of the second plurality of beacons based at least on the beacons selected by the diversity component and the beacon reference data associated with the selected beacons.

16. The computer storage media of claim 15, wherein the intersection component, diversity component, and refiner component are implemented with a database programming language.

17. The computer storage media of claim 15, wherein the intersection component, diversity component, and refiner component model the first plurality of beacons and the second plurality of beacons as graph-theoretic data structures.

18. The computer storage media of claim 15, wherein the refiner component calculates an error radius for the second positional data.

19. The computer storage media of claim 15, wherein the diversity component selects beacons that are spatially diverse by finding the maximum independent subset of the beacons identified by the intersection component.

20. The computer storage media of claim 15, wherein the beacon reference data associated with the first plurality of beacons comprises known or estimated positions of the first plurality of beacons.

* * * * *